Oct. 19, 1954  E. F. ZIEGLER  2,691,999
COLLAPSIBLE TRACTION DEVICE
Filed July 9, 1948
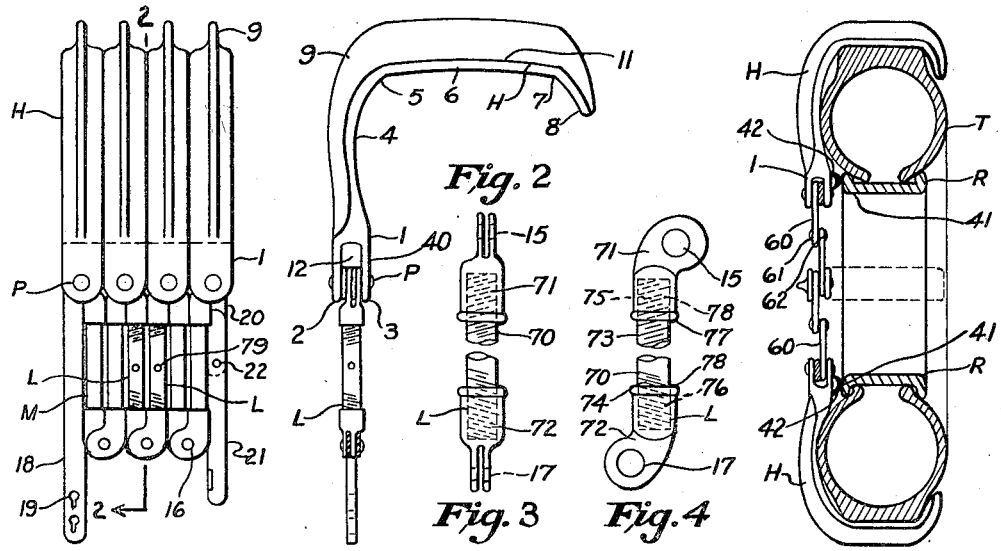
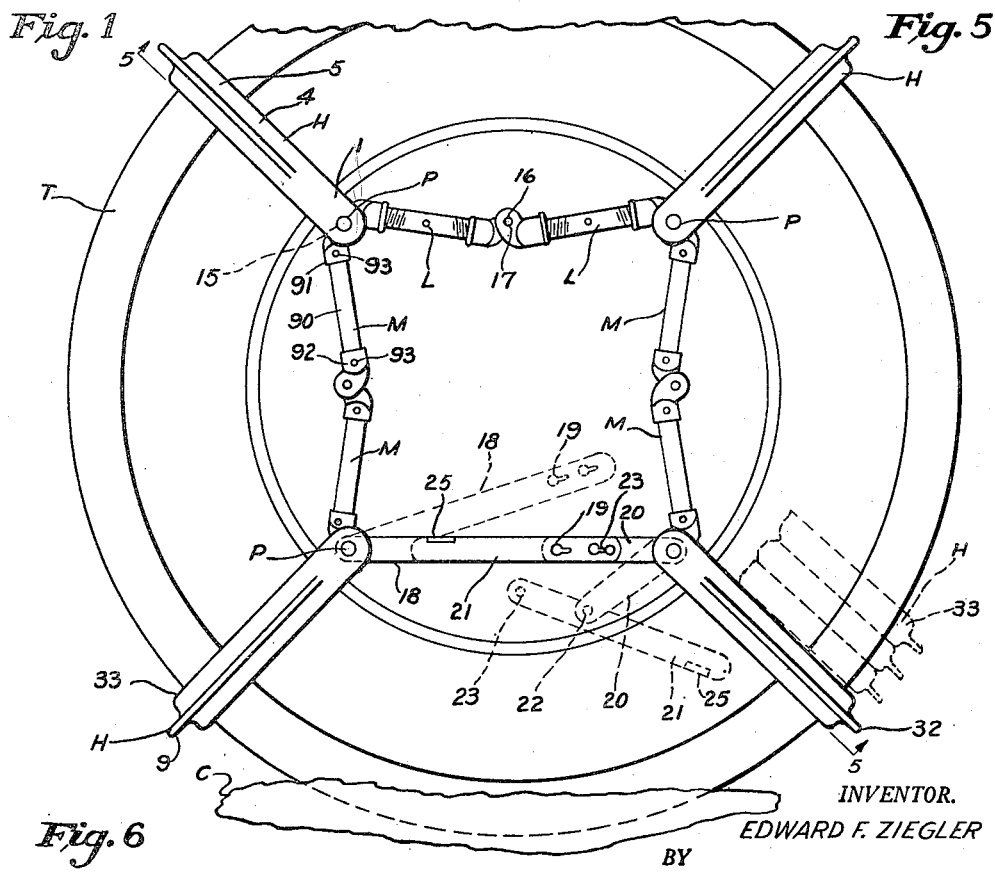
INVENTOR.
EDWARD F. ZIEGLER
BY
Pearson + Pearson
ATTORNEYS Patented Oct. 19, 1954

2,691,999

UNITED STATES PATENT OFFICE 2,691,999

COLLAPSIBLE TRACTION DEVICE

Edward F. Ziegler, Reading, Mass.

Application July 9, 1948, Serial No. 37,800

11 Claims. (Cl. 152—228)

This invention relates to traction devices for the tires of vehicle wheels.

It has heretofore been proposed to use in place of the well known tire chains, made up of side chains and cross chains, a number of rigid U-shaped members, sometimes called mud hooks, which overlie the tread and are connected together in various ways. The installation and removal of ordinary link type tire chains is a dirty and complicated process usually requiring the jacking up of the car. The advantage of rigid mud hooks is that they can be installed from the outside of the tire without difficulty, even while the vehicle is stuck in mud or snow.

However a number of U-shaped hooks connected by chains, wire ropes, channel irons or metal rings as in previous devices makes an inconvenient assembly when removed from the tire, requiring considerable space for storage. Similarly upon removal from storage the parts of such assemblies must be arranged in order and in proper position before they are ready to be placed over a tire.

It is the object of my invention to provide pivoted connecting members between each hook, which can be folded into a small, neat package for storage and which can be easily opened out to the extended position for rapid placement on the tire. I use at least four mud hooks and provide a pair of pivoted legs between each two hooks together with a convenient lever operated latch to join the free ends of two of the legs.

The pivoted connecting members of my device, which I call legs, may each be a solid bar with pivot pin holes at each end but each leg may also comprise a hollow tube, to which a clevis is threaded or pinned on each end.

I call my polygonal arrangement of jointed or pivoted legs or bars a frame and call each two legs extending between two adjacent mud hooks a section of the frame. I call the intersection point of two adjacent sections a corner and I pivot a mud hook to each corner in order that it may yield with the compression of the vehicle tire.

My mud hook has a straight shank and is bent outwardly, then inwardly around the tread of tire and hugs the far side of the tread and the upper portion of the tire. There is thus an easy sliding fit between the upper sides of the tire and the tread with the inner surface of my curved mud hook. I have discovered that the expansion of the tire at the point of contact with the surface upon which it travels, causes the tire to grasp the mud hook tightly while undergoing traction stresses thus insuring that the mud hook will not be distorted or cast off although it may pivot slightly. There is, however, sufficient clearance between the mud hook and the tire at other points on the circumference to permit the mud hook to be withdrawn or installed.

I may also provide a central upstanding rib on the outer surface of the mud hook to give added strength and added traction and I prefer to bifurcate the end of the mud hook shank so that the ends of two pivoted legs may be held on a pivot pin therein.

I may provide bosses on the inside of the hook shank to bear against the tire rim and thus assist in holding the mud hook in the desired position. I may provide suitable studs or stops on the pivoted legs of my frame to prevent their folding outwardly, and to insure that they fold inwardly toward the centre of the wheel. The yoke or bifurcated shank of my mud hook serves as such a stop and, if desired, I may provide a projecting stud on the shank near the pivot pin of the legs to act as a stop also.

A particular advantage of my device is that when off the tire and in the folded position, the adjacent pivoted legs make a convenient handle and the adjacent mud hooks form an efficient scoop or shovel, thus enabling the operator to clear away loose snow, mud or dirt from around the vehicle tires. Similarly the pivoted legs, when folded, form an extension of the shank of the mud hook by which the hooks may be easily controlled and handled during installation on a tire.

My latching mechanism is of the lever type and consists of a grooved or perforated leg pivoted to one mud hook, another leg pivoted to an adjacent mud hook and a lever pivoted to the second leg and provided with a link or stud to cooperate with the grooves or perforations in the first leg.

In view of the extreme drop fenders currently used on motor vehicles, and the very small clearance between tire and fender, I prefer to place my mud hooks on either of the lower quadrants of the tire while they are in the folded position. I may hold the lower hook in place and draw the other hooks around the tire causing the folding legs to open and permitting the hooks to be properly spaced when the legs are in the extended position. However, I prefer instead to slide the entire assembly around to the top of the tire. I then separate the hooks evenly on either side, letting gravity assist in spacing the hooks evenly around the circumference of the tire. The free ends of each leg, pivoted to the two lowest mud hooks, can then be fastened together by my lever type latch.

It should be noted that the above operation does not involve that section of the tire in contact with the ground, mud, or snow and that, therefore, the vehicle need not be moved or raised to apply my traction device. It is not necessary for the operator to remove his gloves to install or remove my device and if ice should form thereon, the lever action of the pivoted legs and latch will quickly free the parts from such ice. It should also be noted that all of the parts of my device are rigid and that no part of the rigid, closed, polygonal frame, which connects the mud hooks, is connected to, or supported by, the tire, rim, hub cap or hub of the wheel.

The parts of my device may be made of any suitable metal but I prefer to use a light metal such as aluminum or magnesium and find that they are sufficiently strong to stand up under the emergency use for which the invention is intended. When in use, on a tire, the whole assembly creeps slowly around the tread, as do ordinary link tire chains, thus distributing evenly any wear on the tire tread or side walls thereof. Because of the short period during which my device is in use and the smooth broad undersurface of the mud hooks wear and tear on the tire is reduced to the minimum.

My assembly of mud hooks and pivoted legs holds itself in the same plane at all times so that during installation and removal there is no possibility of the parts becoming entangled with each other or with any parts of the wheel, tire or fender housing. It can be removed or installed with the clamp or latch in any position around the circumference, and is so easy to operate that it is more likely to be removed after use in an emergency than are tire chains, thus insuring long wear.

In the drawings, Fig. 1 is a front elevation of my traction device in folded position as it may be stored or applied to a vehicle tire.

Fig. 2 is a side elevation on line 2—2 of the device shown in Fig. 1.

Fig. 3 is a side elevation of the preferred form of pivoted leg used in my device.

Fig. 4 is a front elevation of the leg shown in Fig. 3.

Fig. 5 is a side view, in section, on line 5—5 of Fig. 6 of a tire, with my device installed but with solid bars as legs.

Fig. 6 is a front view of the preferred form of my device installed on a vehicle tire.

As shown, H, H are U-shaped mud hooks having a straight shank 1, bifurcated into two forks 2 and 3 at the lower end thereof. Hooks H are bent outwardly at 4 to accommodate the circular side of a tire and then bent inwardly at 5 to form a tread portion 6 to rest on the tread of the tire T. Each hook H is bent downwardly at 7 to form a short holding portion 8 on the far side of tire T. An upstanding rib 9 is provided to strengthen hook H and to cut into snow or ice and furnish additional traction. The outer surface of hook H at 11 may be serrated or otherwise roughened to give further traction if desired.

A pivot pin or bolt P is provided passing through openings 12 in forks 2 and 3 of shank 1 and held in place by any suitable means such as welding. Two legs L or M are pivotally mounted on the pin P of each hook H which passes through a pivot pin opening 15 in each leg. The other ends of legs L or M are pivoted together by a pin 16 passing through pivot pin openings 17 in legs L or M thus joining each hook H with two jointed or pivoted legs L, L.

As shown in Figs. 1, 2 and 6, a leg 18 is provided on one hook H, which is slightly longer than a leg such as L, and which has holes 19, 19, near the free end thereof. A leg 20 is provided on adjacent hook H, and a lever 21 is pivoted thereto by a pin 22. On lever 21 is a stud 23 for registering with a hole such as 19, 19 in 18. Lever 21 may thus be turned on its pivot 22, so that stud 23 can be inserted in a hole 19 and the lever may be moved into position flush with 20 and 18 thus drawing the legs 18 and 20 together with mechanical advantage and holding them in place. A catch 25, holds lever 21 in place by friction.

The inner side 40 of shank 1 of hooks H preferably touches the side edge 41 of tire rim R to assist in preventing the hook H from becoming displaced. However as shown in Fig. 5, I may provide a boss 42 on shank 1 to serve the same purpose and still hold the shank 1 at a definite distance from the rim R.

In Fig. 1, I show my device folded as for storage in a small container and in operation I prefer to place my device on a tire in this folded position as indicated in dotted lines in Fig. 6. By placing my hooks on the tire in the lower quadrants of the tire, there is adequate space without interference from the fenders of the vehicle or the snow or ice indicated at C.

The operator may then hold the lower hook such as 32 in place and draw the upper hook 33 around the tire under the fender until the legs L are extended as shown in full lines in Fig. 6. The fastening legs 18 and 20 are then in position to be joined and locked by lever 21 which serves to tighten the frame and hooks on the tire. It is preferable, however, to slide the folded hooks to the top of the tire, and permit them to slide downward on each side of the tire by gravity.

As indicated in Fig. 5, I may use solid bars 60, 60 for my pivoted legs, each having a pivot hole 61 at each end for pivot pins 62. I prefer to use, however, the construction shown in detail in Figs. 3 and 4, consisting of a hollow tube 70 and clevises 71 and 72 at each end. Tube 70 is oppositely threaded at 73 and 74 while each clevis is internally threaded at 75 and 76, thus permitting the leg to be lengthened or shortened as desired. Lock nuts 77 and 78 are provided to maintain the parts in position and a hole 79 is also provided for the insertion of a turning instrument.

All of the jointed legs of my device may be adjustable in length, as indicated in Figs. 3 and 4, in order that each tube 70 may be tightened a proportionate amount in the clevises 71 and 72. In actual practice, however, I find, as shown in Fig. 1 and Fig. 6, that one section only of adjustable legs L, L is sufficient and the other legs M, M may consist of tubes 90 to which clevises 91 and 92 are welded or are pinned by a pin 93.

By the word "polygon" and the word "polygonal," used to describe the frame of the invention herein, I mean a plane closed figure having at least four angles and at least four sides or sections.

I claim:

1. A compact folding traction device for a vehicle tire comprising a closed polygonal frame made up of at least four side sections placed end to end and connected at said ends by pivots, said sections each comprising a pair of aligned legs extending between adjacent hook-like members, one pair of legs having latching mechanism connecting said legs to each other and each other pair of legs being pivotally interconnected and adapted to fold inwardly toward the centre of the tire against each other, and at least four hook-like members each adapted to engage around the tread of the tire and each pivotally mounted at the pivot point of said sections.

2. A folding traction device for detachable mounting on a vehicle tire comprising at least four U shaped hooks circumferentially spaced about said tire, each having a shank extending radially inward from the circumferential surface of said tire and a foldable frame, said frame consisting of a latching member comprising two separable rigid elements in engagement with each other and at least three connecting members pivotally connecting said shanks, each connecting member comprising two aligned rigid elements extending between two adjacent shanks and pivoted for folding against each other.

3. A traction device for a vehicle tire comprising a frame made up of at least eight rigid elongated elements pivoted end to end around the outside of the tire in the form of a polygon; at least four hook-like members each pivotally mounted at an alternate pivot around said frame, and each adapted to engage the tread of said tire and latching means forming the pivotal connection between the adjacent ends of two of said bars for opening and closing said frame.

4. A traction device for vehicle tires comprising at least four mud hooks, each having its shank on the same side of a tire and each hooked transversely over the tread of the tire at spaced distances therearound; at least four connecting members of elongated rigid metal bar material each member extending between, and hinge pivoted to the shanks of an adjacent pair of mud hooks, said connecting members forming a closed polygonal frame entirely of rigid material extending around a side of the tire for connecting said mud hooks together, and all of said connecting members being each formed of at least two bars of rigid material joined centrally of the member by a hinge pivot connection for enabling the compact folding of said device.

5. A combination as specified in claim 4 wherein the hinge pivot connections for folding said device each include pivot stop means for preventing outward folding thereof in a direction opposite to the direction of the hook shanks.

6. A combination as specified in claim 4 plus a lever for applying mechanical leverage to tighten said frame around said tire, said lever being hinge pivoted to one of said bars centrally of one of said members to fold parallel to said bar.

7. In a collapsible traction device of the type having an endless polygonal frame positioned around the side of a vehicle tire, the sides of said frame being hinge pivoted at, and having a mud hook extending over, the tire tread with its shank pivotally mounted at each apex of the polygon; the combination of a pair of rigid elongated bars forming each said frame side, each bar being pivotally interconnected to one of each two adjacent mud hooks at one end thereof and being pivotally interconnected at its opposite end, centrally of a frame side, to the adjacent end of the other of said pair.

8. A combination as specified in claim 7 wherein all of said bars are pivotally interconnected to each other and to said hooks for folding only inwardly into juxtaposition with each other, and in extension of the shanks of said mud hooks.

9. A combination as specified in claim 7 plus an additional rigid bar pivotally mounted on one of said bars centrally of a frame side, said additional bar having means for interengaging the other bar of the pair with leverage for opening and closing said frame.

10. A traction device for vehicle tires comprising a plurality of identical mud hooks arranged in a row in juxtaposition to each other; a plurality of centrally hinge pivoted, unfoldable, members of rigid material, each member being hinge pivoted at its terminal ends to two adjacent mud hooks for supporting said hooks in row formation and connecting said hooks when unfolded and spaced around a tire; and a latching member including a first elongated bar of rigid material hinge pivoted to the hook at one end of said row, a second elongated bar of rigid material hinge pivoted to the hook at the other end of said row and latching means of rigid material mounted on a free end of one of said bars and attachable to the free end of the other bar for connecting the end hooks of said row when the device is unfolded and the hooks spaced around a tire.

11. A device as specified in claim 10 wherein said latching means comprises a third bar of rigid material hinge pivoted at the free end of one of said bars and having a pin at a free end thereof for engaging a pin recess in the free end of the other said bar.

References Cited in the file of this patent

UNITED STATES PATENTS

| Number | Name | Date |
| --- | --- | --- |
| 974,825 | Redmond | Nov. 8, 1910 |
| 1,213,410 | Powell | Jan. 23, 1917 |
| 1,295,294 | Fink | Feb. 25, 1919 |
| 1,370,293 | Dowell | Mar. 1, 1921 |
| 1,469,105 | Parent | Sept. 25, 1923 |
| 1,727,652 | Leavitt | Sept. 10, 1929 |
| 1,941,935 | Erickson | Jan. 2, 1934 |
| 2,273,753 | Gelinas | Feb. 17, 1942 |
| 2,315,838 | Bryon | Apr. 6, 1943 |
| 2,352,788 | Hinds | July 4, 1944 |
| 2,467,654 | Boje | Apr. 19, 1949 |
| 2,553,712 | Jensen | May 22, 1951 |